US012755997B2

(12) United States Patent
Iwamoto

(10) Patent No.: US 12,755,997 B2
(45) Date of Patent: Oct. 6, 2026

(54) CELL, CELL STACK DEVICE, MODULE, AND MODULE HOUSING DEVICE

(71) Applicant: KYOCERA Corporation, Kyoto (JP)

(72) Inventor: Takayuki Iwamoto, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 758 days.

(21) Appl. No.: 18/022,076

(22) PCT Filed: Aug. 24, 2021

(86) PCT No.: PCT/JP2021/031007

§ 371 (c)(1),
(2) Date: Feb. 17, 2023

(87) PCT Pub. No.: WO2022/045141

PCT Pub. Date: Mar. 3, 2022

(65) Prior Publication Data

US 2023/0327162 A1 Oct. 12, 2023

(30) Foreign Application Priority Data

Aug. 24, 2020 (JP) ................................ 2020-140866

(51) Int. Cl.

| | |
|---|---|
| ***H01M 8/1213*** | (2016.01) |
| ***H01M 8/1253*** | (2016.01) |
| ***H01M 8/2475*** | (2016.01) |
| *H01M 8/12* | (2016.01) |

(52) U.S. Cl.

CPC ....... *H01M 8/1213* (2013.01); *H01M 8/1253* (2013.01); *H01M 8/2475* (2013.01); *H01M 2008/1293* (2013.01)

(58) Field of Classification Search

CPC ............ H01M 8/1213; H01M 8/1253; H01M 8/2475; H01M 2008/1293; H01M 4/9033; H01M 8/1226; H01M 8/1246; H01M 8/2425; H01M 8/2432; H01M 8/12; H01M 8/04; H01M 4/86; Y02E 60/50

See application file for complete search history.

(56) References Cited

U.S. PATENT DOCUMENTS

| | | | | |
|---|---|---|---|---|
| 2011/0305972 A1* | 12/2011 | Kobayashi .......... | H01M 4/8657 429/496 |
| 2014/0080029 A1* | 3/2014 | Hori .................... | H01M 8/0204 429/465 |
| 2014/0377683 A1* | 12/2014 | Inoue ................. | H01M 8/2483 429/482 |
| 2016/0164108 A1 | 6/2016 | Matsuno et al. | |

(Continued)

FOREIGN PATENT DOCUMENTS

| | | |
|---|---|---|
| EP | 2398103 A1 | 12/2011 |
| JP | 2013-229219 A | 11/2013 |

(Continued)

*Primary Examiner* — Muhammad S Siddiquee

(74) *Attorney, Agent, or Firm* — Procopio, Cory, Hargreaves & Savitch LLP

(57) ABSTRACT

A cell includes an element portion including a fuel electrode, a solid electrolyte layer, an air electrode, and an intermediate layer. The intermediate layer is located between the solid electrolyte layer and the air electrode. In a plan view, a porosity in an end portion of the air electrode is greater than a porosity in a center portion of the air electrode.

10 Claims, 17 Drawing Sheets

(56) References Cited

U.S. PATENT DOCUMENTS

| | | | | |
|---|---|---|---|---|
| 2019/0074347 | A1* | 3/2019 | Funaki | H01L 21/568 |
| 2021/0273249 | A1* | 9/2021 | Fujimoto | H01M 8/12 |

FOREIGN PATENT DOCUMENTS

| | | | | |
|---|---|---|---|---|
| JP | 2015-035416 | A | 2/2015 | |
| JP | 5882433 | B1 | 3/2016 | |
| JP | 2016-081718 | A | 5/2016 | |
| JP | 2018-147660 | A | 9/2018 | |
| WO | WO-2018198352 | A1 * | 11/2018 | H01M 8/02 |
| WO | 2019/240297 | A1 | 12/2019 | |

* cited by examiner

CELL, CELL STACK DEVICE, MODULE, AND MODULE HOUSING DEVICE

CROSS-REFERENCE TO RELATED APPLICATIONS

This application is national stage application of International Application No. PCT/JP2021/031007, filed on Aug. 24, 2021, which designates the United States, incorporated herein by reference, and which claims the benefit of priority from Japanese Patent Application No. 2020-140866, filed on Aug. 24, 2020, the entire contents of which are incorporated herein by reference.

TECHNICAL FIELD

The present disclosure relates to a cell, a cell stack device, a module, and a module housing device.

BACKGROUND OF INVENTION

In recent years, various fuel cell stack devices each including a plurality of fuel cells have been proposed as next-generation energy sources. A fuel cell is a type of cell capable of obtaining electrical power by using a fuel gas such as a hydrogen-containing gas and an oxygen-containing gas such as air.

In such a fuel cell stack device, for example, an intermediate layer may be provided between a solid electrolyte layer and an air electrode in an element portion in the fuel cell (see Patent Document 1).

CITATION LIST

Patent Literature

Patent Document 1: JP 2015-35416 A

SUMMARY

According to one aspect of the embodiments, a cell includes an element portion including a fuel electrode, a solid electrolyte layer, an air electrode, and an intermediate layer. The intermediate layer is located between the solid electrolyte layer and the air electrode. In a plan view, a porosity in an end portion of the air electrode is greater than a porosity in a center portion of the air electrode.

Also, a cell stack device of the present disclosure includes a cell stack including a plurality of the cells mentioned above.

Also, a module of the present disclosure includes the cell stack device mentioned above and a housing container that houses the cell stack device.

Also, a module housing device of the present disclosure includes the module mentioned above, an auxiliary device for operating the module, and an external case that houses the module and the auxiliary device.

DESCRIPTION OF EMBODIMENTS

Hereinafter, embodiments of a cell, a cell stack device, a module, and a module housing device disclosed in the present application will be described with reference to the accompanying drawings. The present invention is not limited by the following embodiments.

Note, further, that the drawings are schematic and that the dimensional relationships between elements, the proportions thereof, and the like may differ from the actual ones. There may be differences between the drawings in the dimensional relationships, proportions, and the like.

First Embodiment

Configuration of Cell

Figure 1A:
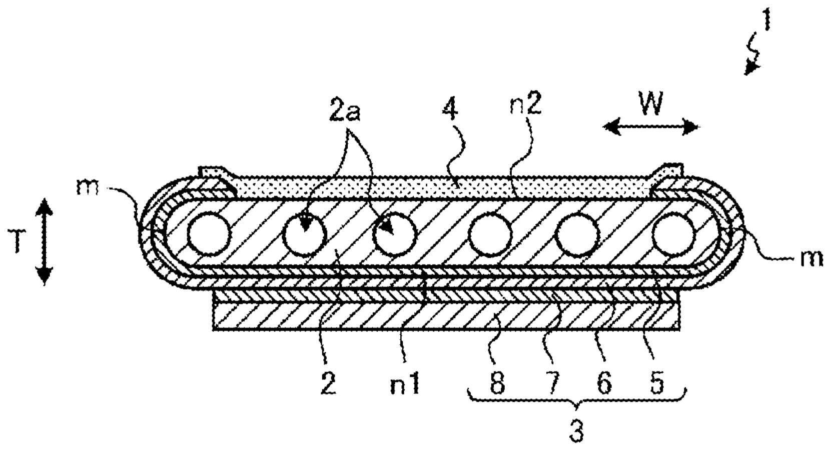
FIG. 1A is a horizontal cross-sectional view illustrating an example of a cell according to a first embodiment.
Figure 1B:
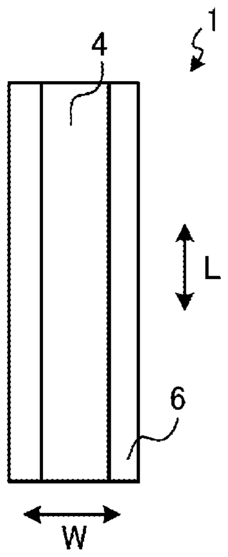
FIG. 1B is a side view of the example of the cell according to the first embodiment, as viewed from an interconnector side.

Referring to FIGS. 1A and 1B, an example of a solid oxide fuel cell will be described as a cell according to a first embodiment.

FIG. 1A is a horizontal cross-sectional view illustrating an example of a cell 1 according to the first embodiment. FIG. 1B is a side view of the example of the cell 1 according to the first embodiment, as viewed from an interconnector side. FIGS. 1A and 1B are enlarged views illustrating portions of the respective configurations of the cell 1.

In the example illustrated in FIGS. 1A and 1B, the cell 1 is a hollow and flat plate, elongated in shape. As illustrated in FIG. 1B, the overall shape of the cell 1 when viewed from the side is, for example, a rectangle having a side length of from 5 cm to 50 cm in a length direction L and a length of from 1 cm to 10 cm in a width direction W orthogonal to the length direction L. The thickness in a thickness direction T of the entire cell 1 is, for example, from 1 mm to 5 mm.

As illustrated in FIG. 1A, the cell 1 includes a support substrate 2 with conductivity, an element portion 3, and an interconnector 4. The support substrate 2 has a pillar shape with a pair of opposing flat surfaces n1, n2 and a pair of side surfaces m in a circular arc shape connecting the flat surfaces n1, n2.

The element portion 3 is located on the flat surface n1 of the support substrate 2. The element portion 3 such as that described above includes a fuel electrode 5, a solid electrolyte layer 6, an intermediate layer 7, and an air electrode 8. Also, in the example illustrated in FIG. 1A, the interconnector 4 is located on the flat surface n2 of the cell 1. The cell 1 may include a second intermediate layer 9, which will be described later, between the intermediate layer 7 and the air electrode 8.

As illustrated in FIG. 1B, the interconnector 4 may extend to the upper and lower ends of the cell 1. At a lower end portion of the cell 1, the interconnector 4 and the solid electrolyte layer 6 are exposed on the surface. As illustrated in FIG. 1A, the solid electrolyte layer 6 is exposed at the surface at the pair of side surfaces m in a circular arc shape of the cell 1. The interconnector 4 need not extend to the lower end of the cell 1. The cell 1 may include a reinforcing layer 23 described below in a region between a lower end and the interconnector 4.

Hereinafter, each of constituent members constituting the cell 1 will be described.

The support substrate 2 includes gas-flow passages 2*a* in which gas flows. The example of the support substrate 2 illustrated in FIG. 1A includes six gas-flow passages 2*a*. The support substrate 2 has gas permeability and allows the fuel gas flowing through the gas-flow passages 2*a* to pass through to the fuel electrode 5. The support substrate 2 may have conductivity. The support substrate 2 having conductivity collects electricity generated in the element portion 3 to the interconnector 4.

The material of the support substrate 2 includes, for example, an iron group metal component and an inorganic oxide. For example, the iron group metal component may be Ni (nickel) and/or NiO. For example, the inorganic oxide may be a specific rare earth element oxide.

As the material of the fuel electrode 5, a commonly known material may be used. As the fuel electrode 5, porous conductive ceramics, for example, ceramics containing: $ZrO_2$ in which a calcium oxide, a magnesium oxide, or a rare earth element oxide is solid-dissolved, and Ni and/or NiO may be used. As the rare earth element oxide, for example, $Y_2O_3$ or the like is used. Hereinafter, $ZrO_2$ in which calcium oxide, magnesium oxide, or a rare earth element oxide is contained as a solid solution may be referred to as stabilized zirconia. The stabilized zirconia also includes partially stabilized zirconia.

The solid electrolyte layer 6 is an electrolyte and bridges ions between the fuel electrode 5 and the air electrode 8. At the same time, the solid electrolyte layer 6 has gas blocking properties, and makes leakage of the fuel gas and the oxygen-containing gas less likely to occur.

The material of the solid electrolyte layer 6 may be, for example, $ZrO_2$ in which from 3 mole % to 15 mole % of a rare earth element oxide is contained as a solid solution. As the rare earth element oxide, for example, $Y_2O_3$ or the like is used. Note that another material may be used as the material of the solid electrolyte layer 6, as long as the material has the aforementioned characteristics.

The intermediate layer 7 functions as a diffusion prevention layer. The intermediate layer 7 makes strontium (Sr) contained in the air electrode 8, which will be described later, less likely to diffuse into the solid electrolyte layer 6, thereby making a resistive layer of $SrZrO_3$ less likely to be formed on the solid electrolyte layer 6.

The material of the intermediate layer 7 is not particularly limited as long as generally used for the diffusion prevention layer of Sr. The material of the intermediate layer 7 includes, for example, cerium oxide ($CeO_2$) in which a rare earth element except Ce (cerium) is in solid solution. As the rare earth element, gadolinium (Gd), samarium (Sm), or the like are used.

The air electrode 8 has gas permeability. The open porosity (porosity) of the air electrode 8 may be, for example, in the range of from 20% to 50%, particularly from 30% to 50%.

The material of the air electrode 8 is not particularly limited, as long as the material is commonly used for the air electrode. The material of the air electrode 8 may be, for example, a conductive ceramic such as an $ABO_3$ type perovskite oxide.

The material of the air electrode 8 may be, for example, a composite oxide in which strontium (Sr) and lanthanum (La) coexist at the A site. Examples of such a composite oxide include $La_xSr_{1-x}Co_yFe_{1-y}O_3$, $La_xSr_{1-x}MnO_3$, $La_xSr_{1-x}FeO_3$, and $La_xSr_{1-x}CoO_3$. Here, x is $0<x<1$, and y is $0<y<1$.

The interconnector 4 is dense, and makes the leakage of the fuel gas flowing through the gas-flow passages 2*a* located inside the support substrate 2, and of the oxygen-containing gas flowing outside the support substrate 2 less likely to occur. The interconnector 4 may have a relative density of 93% or more, particularly 95% or more.

As the material of the interconnector 4, a lanthanum chromite-based perovskite oxide ($LaCrO_3$-based oxide), a lanthanum strontium titanium-based perovskite oxide ($LaSrTiO_3$-based oxide), or the like may be used. These materials have conductivity, and are neither reduced nor oxidized even when in contact with a fuel gas such as a hydrogen-containing gas and an oxygen-containing gas such as air.

Configuration of Cell Stack Device

Figure 2A:
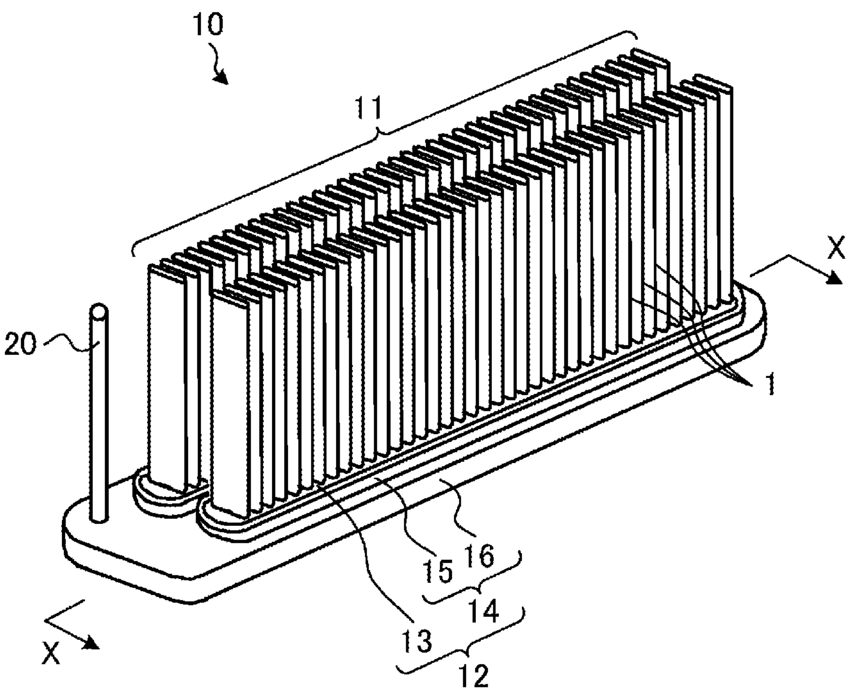
FIG. 2A is a perspective view illustrating an example of a cell stack device according to the first embodiment.

Next, a cell stack device 10 according to the present embodiment using the cell 1 described above will be described with reference to FIGS. 2A to 2C. FIG. 2A is a perspective view illustrating an example of a cell stack device according to the first embodiment, FIG. 2B is a cross-sectional view taken along line X-X illustrated in FIG. 2A, and FIG. 2C is a top view illustrating an example of the cell stack device according to the first embodiment.

As illustrated in FIG. 2A, the cell stack device 10 includes a cell stack 11 that includes a plurality of the cells 1 arrayed (stacked) in the thickness direction T (see FIG. 1A) of the cell 1, and a fixing member 12.

The fixing member 12 includes a fixing material 13 and a support member 14. The support member 14 supports the cells 1. The fixing material 13 fixes the cells 1 to the support member 14. Further, the support member 14 includes a support body 15 and a gas tank 16. The support body 15 and the gas tank 16, constituting the support member 14, are made of metal and electrically conductive.

Figure 2B:
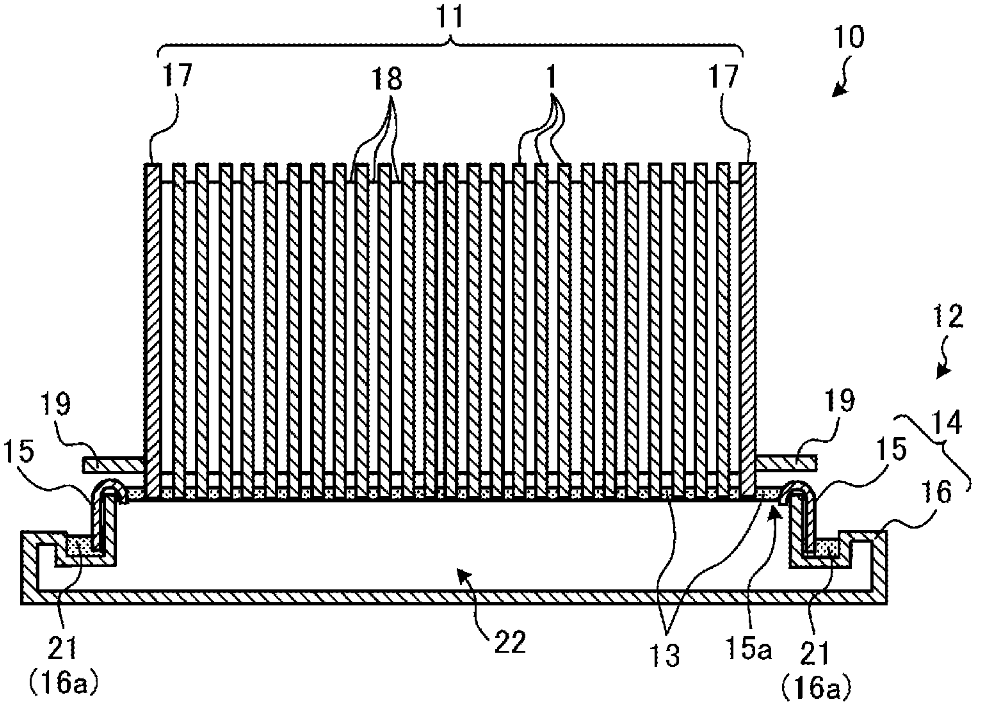
FIG. 2B is a cross-sectional view taken along the line X-X illustrated in FIG. 2A.
Figure 2C:
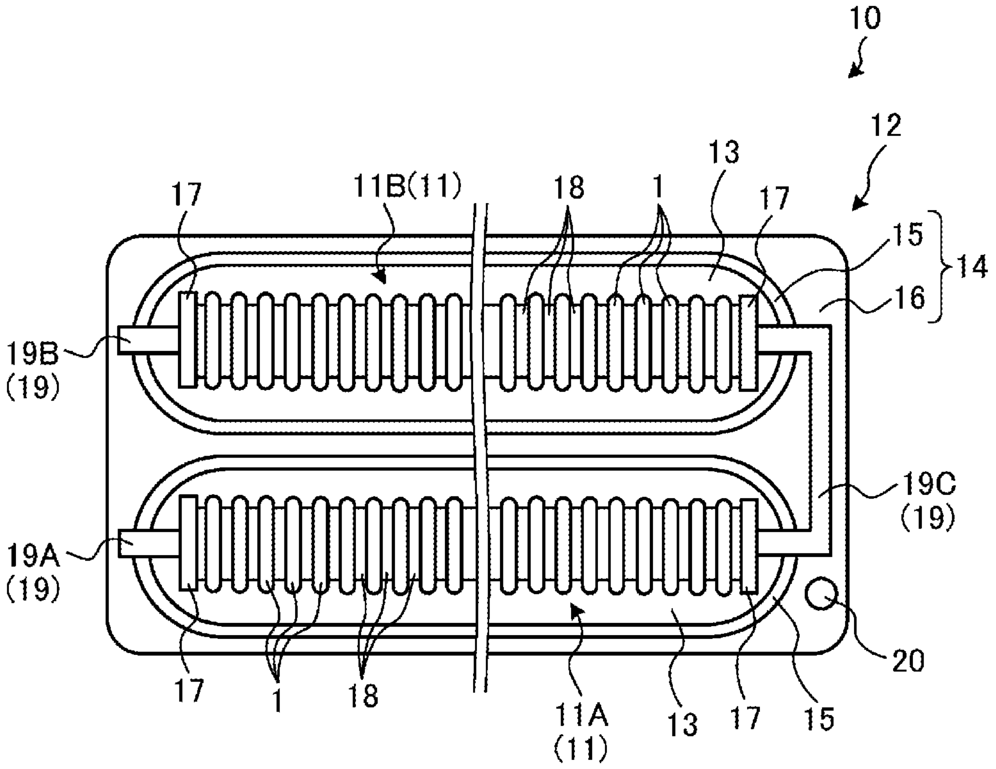
FIG. 2C is a top view illustrating the example of the cell stack device according to the first embodiment.

As illustrated in FIG. 2B, the support body 15 includes an insertion hole 15*a* into which the lower end portion of the plurality of cells 1 are inserted. The lower end portions of the plurality of cells 1 and the inner wall of the insertion hole 15*a* are joined by the fixing material 13.

The gas tank 16 includes an opening portion through which a reaction gas is supplied to the plurality of cells 1 via the insertion hole 15*a*, and a recessed groove 16*a* located in the periphery of the opening portion. The outer peripheral end portion of the support body 15 is joined to the gas tank 16 by a jointing material 21 with which the recessed groove 16*a* of the gas tank 16 is filled.

In the example illustrated in FIG. 2A, the fuel gas is stored in an internal space 22 formed by the support body 15 and the gas tank 16. The support body 15 and the gas tank 16 constitute the support member 14. The gas tank 16 includes a gas circulation pipe 20 connected thereto. The fuel gas is supplied to the gas tank 16 through this gas circulation pipe 20, and is supplied from the gas tank 16 to the gas-flow passages 2*a* (see FIG. 1A) inside the cells 1. The fuel gas supplied to the gas tank 16 is produced by a reformer 102 (see FIG. 6), which will be described later.

A hydrogen-rich fuel gas can be produced, for example, by steam reforming a raw fuel. When the fuel gas is produced by the steam reforming, the fuel gas contains steam.

In the example illustrated in FIG. 2A, two rows of the cell stacks 11, two of the support bodies 15, and the gas tank 16 are provided. Two rows of the cell stacks 11 each have a plurality of cells 1. Each of the cell stacks 11 is fixed to a corresponding one of the support bodies 15. The gas tank 16 includes two through holes in an upper surface thereof. Each of the support bodies 15 is disposed in a corresponding one of the through holes. The internal space 22 is formed by the single gas tank 16 and the two support bodies 15.

The insertion hole 15*a* has, for example, an oval shape in a top surface view. The length of the insertion hole 15*a*, for example, in an array direction of the cells 1, that is, the thickness direction T thereof, is greater than the distance between two end current collectors 17 located at two ends of the cell stack 11. The width of the insertion hole 15*a* is, for example, greater than the length of the cell 1 in the width direction W (see FIG. 1A).

As illustrated in FIG. 2B, the joined portions between the inner wall of the insertion hole 15*a* and the lower end portions of the cells 1 are filled with the fixing material 13 and solidified. As a result, the inner wall of the insertion hole 15*a* and the lower end portion of the plurality of cells 1 are bonded and fixed, and the lower end portions of the cells 1 are bonded and fixed to each other. Each of the cells 1 includes, at the lower end portion thereof, the gas-flow passages 2*a* that communicate with the internal space 22 of the support member 14.

The fixing material 13 and the bonding material 21 may be of low conductivity, such as a glass. As the specific materials of the fixing material 13 and the jointing material 21, amorphous glass or the like may be used, and especially, crystallized glass or the like may be used.

As the crystallized glass, for example, any one of the group consisting of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or particularly, a $SiO_2$—MgO-based material may be used.

As illustrated in FIG. 2B, electrically conductive members 18 are interposed between adjacent ones of the cells 1 of the plurality of cells 1. Each of the electrically conductive members 18 electrically connects in series one of the adjacent ones of the cells 1 to another one of the adjacent ones of the cells 1. More specifically, the electrically conductive member 18 connects the fuel electrode 5 of one of cells 1 with the air electrode 8 of another one of the cells 1.

Further, as illustrated in FIG. 2B, the end current collectors 17 are electrically connected to the cells 1 located at the outermost sides in the array direction of the plurality of cells 1. The end current collectors 17 are each connected to an electrically conductive portion 19 protruding outward from the cell stack 11. The electrically conductive portion 19 collects electricity generated by the cells 1, and conducts the electricity to the outside. Note that in FIG. 2A, the end current collectors 17 are not illustrated.

Further, as illustrated in FIG. 2C, the cell stack device 10 may be one battery in which two cell stacks 11A and 11B are connected in series. In this case, the electrically conductive portion 19 of the cell stack device 10 may include a positive electrode terminal 19A, a negative electrode terminal 19B, and a connection terminal 19C.

The positive electrode terminal 19A functions as a positive electrode when the electrical power generated by the cell stack 11 is output to the outside, and is electrically connected to the end current collector 17 on a positive electrode side in the cell stack 11A. The negative electrode terminal 19B functions as a negative electrode when the electrical power generated by the cell stack 11 is output to the outside, and is electrically connected to the end current collector 17 on a negative electrode side in the cell stack 11B.

The connection terminal 19C electrically connects the end current collector 17 on a negative electrode side in the cell stack 11A and the end current collector 17 on a positive electrode side in the cell stack 11B.

Details of Element Portion

Figure 3:
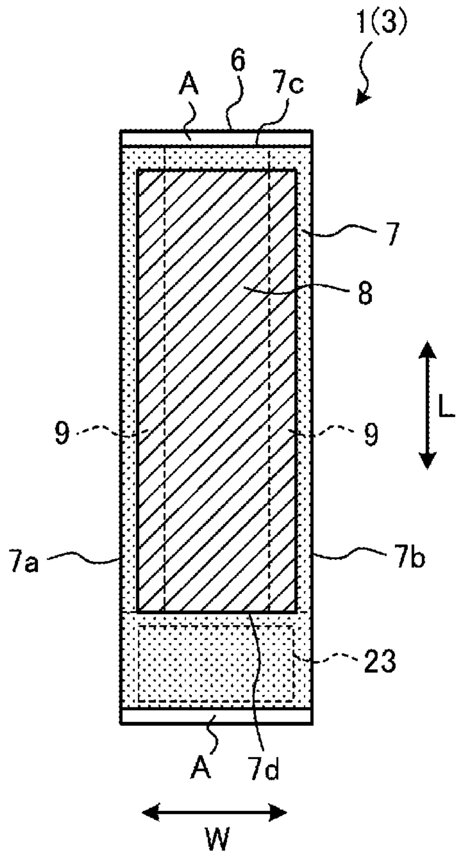
FIG. 3 is a side view of an example of a cell according to a variation of the first embodiment, as viewed from an air electrode side.
Figure 4:
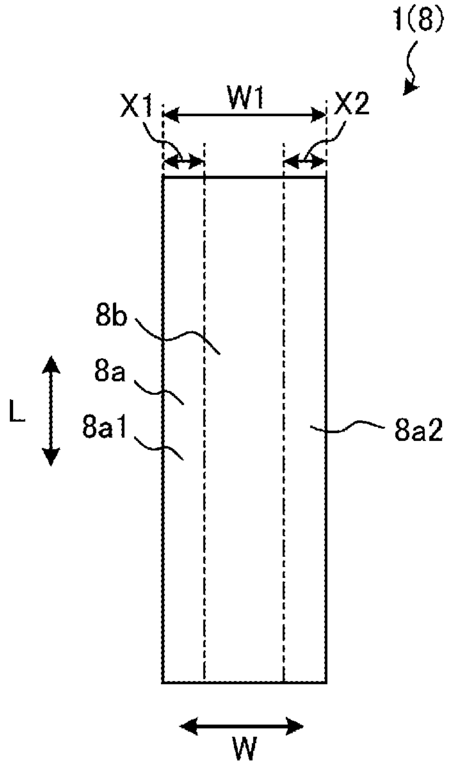
FIG. 4 is a diagram for illustrating an end portion and a center portion of an air electrode according to the first embodiment.
Figure 5:
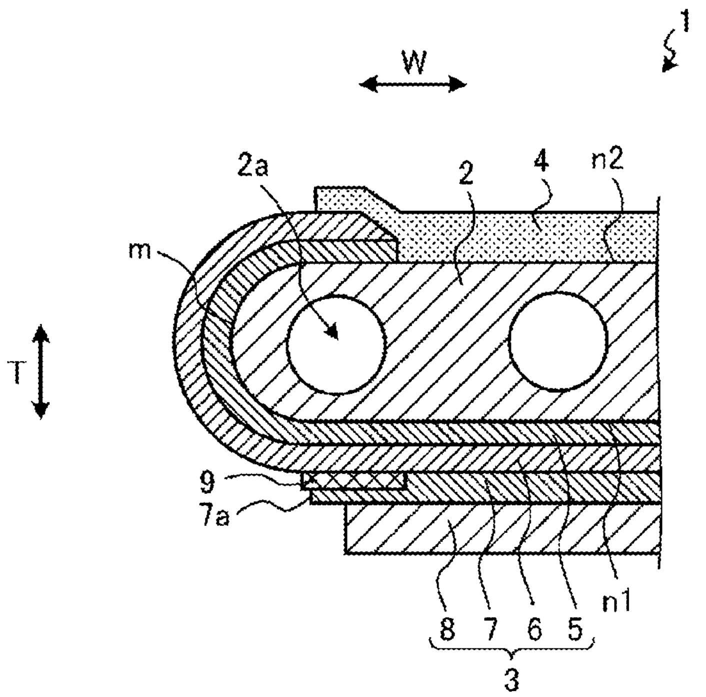
FIG. 5 is an enlarged horizontal cross-sectional view illustrating the example of the cell according to the first embodiment.

Details of the element portion 3 according to the first embodiment will be described with reference to FIGS. 3 to 5. FIG. 3 is a side view of an example of the cell according to the first embodiment, as viewed from the air electrode side. FIG. 4 is a diagram for illustrating an end portion and a center portion of the air electrode according to the first embodiment. FIG. 5 is an enlarged horizontal cross-sectional view illustrating the example of the cell according to the first embodiment.

As illustrated in FIG. 3, the intermediate layer 7 is located over the entire surface of the solid electrolyte layer 6, as viewed from the air electrode 8 side, except for the upper and lower end portions of the cell 1. In other words, non-film-forming portions A in which the intermediate layer 7 is not located on the surface of the solid electrolyte layer 6, may be included at the upper and lower end portions of the cell 1 respectively, as viewed from the air electrode 8 side.

Such non-film-forming portions A are located along at least two sides (top side and bottom side in the embodiment) of the cell 1. The non-film-forming portions A may have, for example, a predetermined width (for example, about 5 mm) from the sides, respectively. In the embodiment, the non-film-forming portions A have a substantially equal width along the top and bottom sides of the cell 1, respectively.

A reinforcing layer 23 is provided between the solid electrolyte layer 6 and the intermediate layer 7 above the non-film-forming portion A at the lower end portion of the cell 1. When the lower end portion of the cell 1 is fixed by a fixing member 12 (see FIG. 2A), the reinforcing layer 23 makes it difficult for the cell 1 to be damaged due to the stress from the fixing member 12.

When the interconnector 4 does not extend to the lower end portion of the cell 1, the reinforcing layer 23 may be located on the flat surface n2 (see FIG. 1A) of the support substrate 2 in a region between the lower end portion of the cell 1 and the interconnector 4.

The reinforcing layer 23 may be, for example, $ZrO_2$ in which from 3 mole % to 15 mole % of a rare earth element oxide is contained as a solid solution. As the rare earth element oxide, for example, $Y_2O_3$ or the like may be used. As long as the reinforcing layer 23 has the above characteristics, the reinforcing layer 23 using other materials or the like may be disposed.

The air electrode 8 is located on the surface of the intermediate layer 7 in a region between the non-film-forming portion A on the upper side of the cell 1 and the reinforcing layer 23. As illustrated in FIG. 4, the air electrode 8 includes end portions 8*a* and a center portion 8*b*.

The end portions 8*a* are regions including a first end portion 8*a*1 and a second end portion 8*a*2 located at both ends in the width direction W when the air electrode 8 is viewed in plan view. The center portion 8*b* is a region sandwiched between the first end portion 8*a*1 and the second end portion 8*a*2 of the end portions 8*a*.

As illustrated in FIG. 4, the first end portion 8*a*1 and the second end portion 8*a*2 of the end portions 8*a* are regions in which distances from the long sides along the width direction W are a predetermined distance X1 or less and a predetermined distance X2 or less, respectively, in the air electrode 8.

In the embodiment, the distance X1 is, for example, 25% of a length W1 in the width direction W of the air electrode 8. The distance X2 is, for example, 25% of the length W1 in the width direction W of the air electrode 8.

In the present embodiment, the porosities of the end portions 8*a* and the center portion 8*b* described above are controlled to improve the battery performance of the cell 1.

That is, in the present embodiment, the porosity in the end portions 8*a* of the air electrode 8 is greater than the porosity in the center portion 8*b*.

As described above, by making the porosity in the end portions 8*a* of the air electrode 8 greater than the porosity in the center portion 8*b*, the end portions 8*a* of the air electrode 8 function as stress relaxation portions. This makes the air electrode 8 less likely to peel off from the intermediate layer 7. This can enhance the durability of the cell 1.

Additionally, by making the porosity in the end portions 8*a* of the air electrode 8 greater than the porosity in the center portion 8*b*, the oxygen-containing gas introduced from the end portion 8*a* sides of the air electrode 8 is easily transferred to the center portion 8*b*. This improves the power generation efficiency of the cell 1.

By making the porosity in the center portion 8*b* of the air electrode 8 smaller than the porosity in the end portions 8*a*, ionic conductivity in the center portion 8*b* of the air electrode 8, which has a greater contribution to power generation than the end portions 8*a*, is improved. This improves the power generation efficiency of the cell 1.

That is, in the element portion 3 according to the present embodiment, the porosity is increased in the end portion 8*a* of the air electrode 8 having a smaller contribution to power generation than the center portion 8*b*, emphasizing a stress relaxation effect rather than the power generation efficiency, while the porosity is decreased in the center portion 8*b*, emphasizing the power generation efficiency. This improves the battery performance of the cell 1.

On the other hand, when the porosity in the end portions 8*a* of the air electrode 8 is smaller than the porosity in the center portion 8*b*, the air electrode 8 may easily peel off from the intermediate layer 7, and the durability of the cell 1 may decrease.

When the porosity in the end portions 8*a* of the air electrode 8 is smaller than the porosity in the center portion 8*b*, the oxygen-containing gas is hardly introduced from the end portion 8*a* sides of the air electrode 8, and thus the oxygen-containing gas is not sufficiently supplied to the center portion 8*b* and is exhausted, i.e., so-called air shortage is likely to occur, and the power generation efficiency in the cell 1 may be reduced.

When the porosity in the center portion 8*b* of the air electrode 8 is greater than the porosity in the end portions 8*a*, the ionic conductivity in the center portion 8*b* of the air electrode 8 may be reduced, and the power generation efficiency of the cell 1 may be reduced.

Here, the porosity of the air electrode 8 can be, for example, in the range of from 20% to 50%, particularly from 30% to 50%. When the porosity of the air electrode 8 is smaller than 20%, the relaxation effect of stress due to voids decreases, and thus, the air electrode 8 may peel off when a temperature cycle is applied to the cell 1 and thermal stress is applied to the air electrode 8, for example.

The porosity in the end portions 8*a* of the air electrode 8 can be, for example, in the range of from 30% to 50%, particularly from 35% to 50%. However, the porosity in the end portions 8*a* of the air electrode 8 is not limited to the range described above, and may be greater than the porosity in the center portion 8*b*.

The porosity in the center portion 8*b* of the air electrode 8 can be, for example, in the range of from 20% to 40%, particularly from 20% to 35%. However, the porosity in the center portion 8*b* of the air electrode 8 is not limited to the range described above, and may be smaller than the porosity in the end portions 8*a*.

Returning to FIG. 3, further description will be provided. The element portion 3 according to the present embodiment may include a second intermediate layer 9 located between the solid electrolyte layer 6 and the intermediate layer 7 as a first intermediate layer. The second intermediate layer 9 is located along at least two sides of the cell 1 in the length direction L and the width direction W (in the embodiment, long sides 7*a* and 7*b* located at both ends in the width direction W), and has a predetermined width (for example, approximately 5 mm) from each side. In the embodiment, the second intermediate layer 9 has a substantially uniform width so as to at least partially overlap the end portions 8*a* of the air electrode 8 in plan view. Note that the intermediate layer 7 as the first intermediate layer and the second intermediate layer 9 may be collectively referred to simply as an "intermediate layer".

The second intermediate layer 9 is a so-called Ce—Zr solid solution including Ce and Zr. The second intermediate layer 9 is interposed between the solid electrolyte layer 6 and the intermediate layer 7, and thus adhesiveness between the intermediate layer 7 as the first intermediate layer and the solid electrolyte layer 6 is further improved. Thus, the air electrode 8 together with the intermediate layer 7 is further less likely to peel off from the solid electrolyte layer 6. This can enhance the durability of the cell 1.

The second intermediate layer 9 is located so as to at least partially overlap the end portions 8*a* of the air electrode 8 in plan view. The second intermediate layer 9 functions as the diffusion prevention layer. The second intermediate layer 9 makes Sr and other components contained in the air electrode 8 less likely to diffuse into the solid electrolyte layer 6 via the intermediate layer 7, thereby reducing the problem that a resistive layer is formed on the solid electrolyte layer 6.

On the other hand, the second intermediate layer 9 has a side surface as a resistive layer having low conductivity. Thus, the second intermediate layer 9 can be located not on the entire element portion 3, but along each side of the air electrode 8 in plan view, which has a limited contribution to power generation efficiency.

That is, in the example illustrated in FIG. 3, the second intermediate layer 9 is located along the long sides 7*a* and 7*b*, of the intermediate layer 7, but the present embodiment is not limited thereto, and the second intermediate layer 9 may be located along an upper side 7*c* of the intermediate layer 7, for example. The second intermediate layer 9 may be located, for example, along a lower portion 7*d* of the intermediate layer 7, the lower portion 7*d* overlapping a bottom side of the air electrode 8 in plan view.

In the example illustrated in FIG. 3, an outer peripheral portion of the element portion 3 has a rectangular shape in plan view. However, in the element portion 3, the outer peripheral portion may have a shape such as a triangular shape, a hexagonal shape, an octagonal shape, a circular shape, or the like. In such a case, the second intermediate layer 9 may be located so as to overlap at least a portion of the outer peripheral portion of the element portion 3, in particular, a pair of portions that face each other with the center portion of the element portion 3 interposed therebetween in plan view. In a case where the element portion 3 has a polygonal shape, the second intermediate layer 9 may be located so as to overlap two or more sides of the outer peripheral portion of the element portion 3.

An end portion of the second intermediate layer 9 need not be located so as to overlap an end portion of the element portion 3 illustrated in FIG. 3. For example, as illustrated in FIG. 5, the end portion of the second intermediate layer 9 may be located so as to protrude from the long side 7*a* (and the long side 7*b*) of the intermediate layer 7 in the width direction W.

Module

Figure 6:
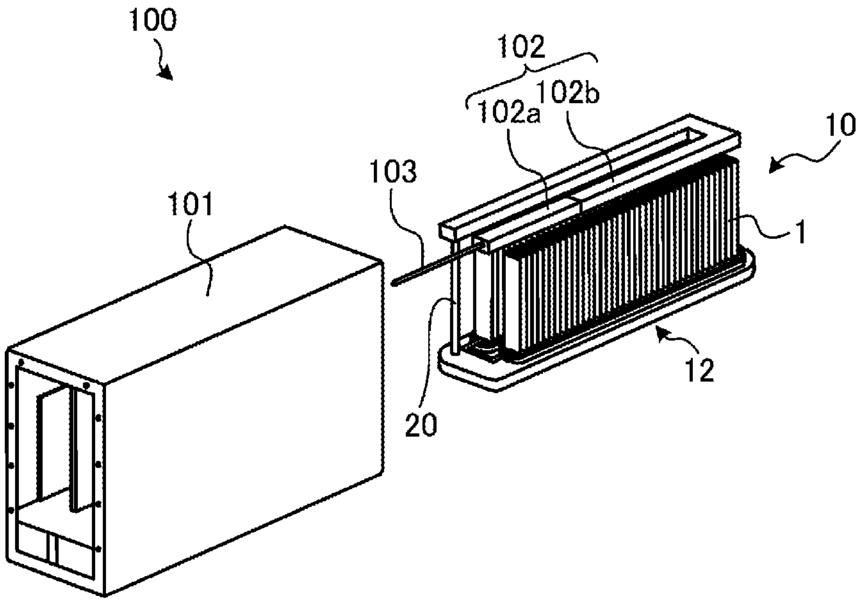
FIG. 6 is an external appearance perspective view illustrating an example of a module according to the first embodiment.

A module 100 according to an embodiment of the present disclosure using the cell stack device 10 described above will be described with reference to FIG. 6. FIG. 6 is an exterior perspective view illustrating a module according to the first embodiment. FIG. 6 illustrates a state in which the front and rear surfaces, which are part of the housing container 101, are removed and the cell stack device 10 of the fuel cell contained therein is taken out rearward.

As illustrated in FIG. 6, the module 100 includes the housing container 101, and the cell stack device 10 housed in the housing container 101. Also, the reformer 102 is disposed above the cell stack device 10.

The reformer 102 generates a fuel gas by reforming a raw fuel such as natural gas and kerosene, and supplies the fuel gas to the cell 1. The raw fuel is supplied to the reformer 102 through the raw fuel supply pipe 103. The reformer 102 may include a vaporizing unit 102*a* for vaporizing water and a reforming unit 102*b*. The reforming unit 102*b* includes a reforming catalyst (not illustrated) for reforming the raw fuel into a fuel gas. Such a reformer 102 can perform steam reforming, which is a highly efficient reforming reaction.

Then, the fuel gas generated by the reformer 102 is supplied to the gas-flow passage 2*a* (see FIG. 1A) of the cell 1 through the gas circulation pipe 20, the gas tank 16, and the support member 14.

In the module 100 having the configuration mentioned above, the temperature in the module 100 during normal power generation is about from 500° C. to 1000° C. due to combustion of gas and power generation by the cell 1.

With the module 100 having such a configuration, as described above, the module 100 can be obtained that is improved in battery performance by being configured to house the cell stack device 10 that is improved in battery performance.

Module Housing Device

Figure 7:
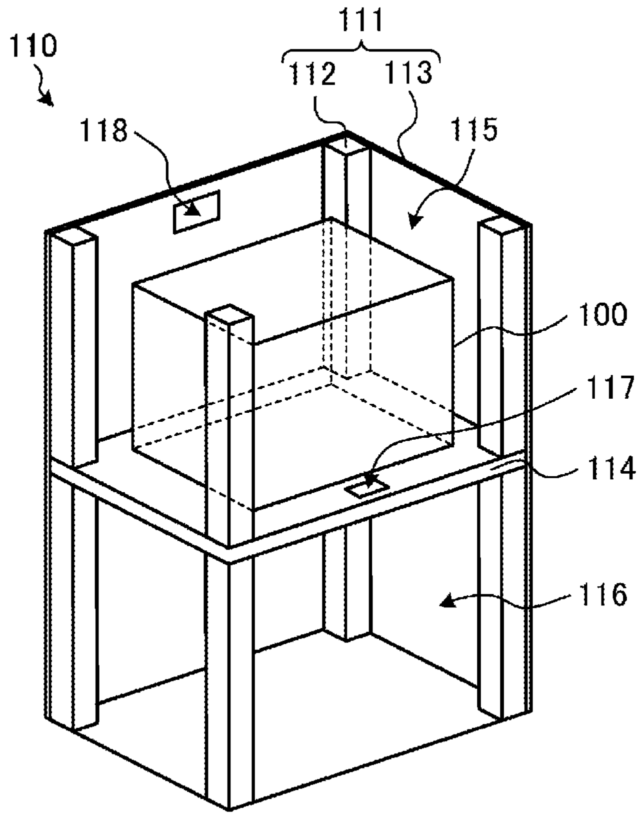
FIG. 7 is an exploded perspective view schematically illustrating an example of a module housing device according to the first embodiment.

FIG. 7 is an exploded perspective view illustrating an example of a module housing device according to the first embodiment. A module housing device 110 according to the present embodiment includes an external case 111, the module 100 illustrated in FIG. 6, and an auxiliary device (not illustrated). The auxiliary device operates the module 100. The module 100 and the auxiliary device are housed in the external case 111. Note that in FIG. 7, a portion of the configuration is omitted.

The external case 111 of the module housing device 110 illustrated in FIG. 7 includes columns 112 and external plates 113. A dividing plate 114 vertically partitions the interior of the external case 111. The space above the dividing plate 114 in the external case 111 is a module housing room 115 that houses the module 100. The space below the dividing plate 114 in the external case 111 is an auxiliary device housing room 116 that houses the auxiliary device that operates the module 100. Note that in FIG. 7, the auxiliary device housed in the auxiliary device housing room 116 is omitted.

The dividing plate 114 includes an air circulation hole 117 for causing air in the auxiliary device housing room 116 to flow into the module housing room 115 side. The external plates 113 constituting the module housing room 115 includes an exhaust hole 118 for discharging air inside the module housing room 115.

With the module housing device 110 having such a configuration, as described above, the module housing device 110 can be obtained that is improved in battery performance by including, in the module housing room 115, the module 100 improved in battery performance.

Variation

Figure 8:
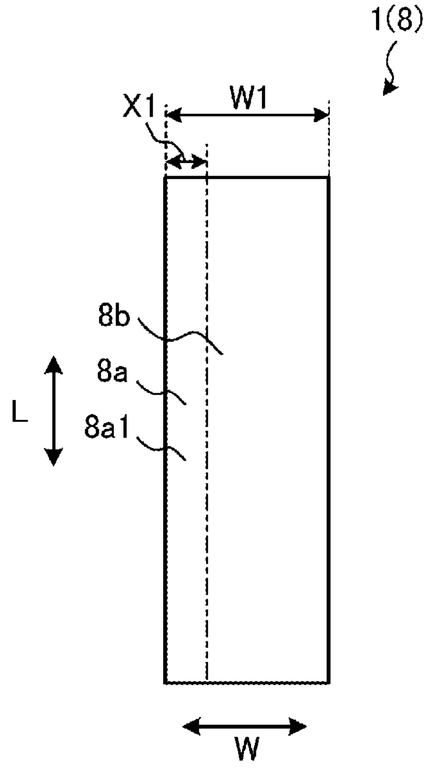
FIG. 8 is a side view of an example of a cell according to a variation of the first embodiment, as viewed from the air electrode side.
Figure 9:
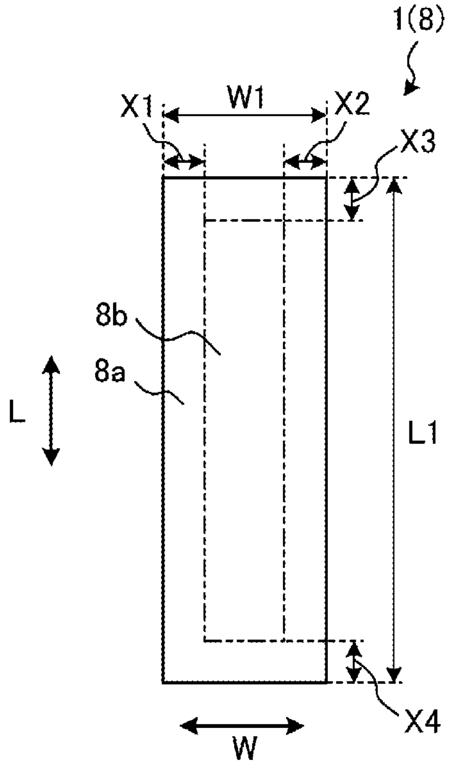
FIG. 9 is a side view of another example of the cell according to the variation of the first embodiment, as viewed from the air electrode side.

FIG. 8 is a side view of an example of a cell according to a variation of the first embodiment, as viewed from the air electrode side. FIG. 9 is a side view of another example of the cell according to the variation of the first embodiment, as viewed from the air electrode side.

In the example illustrated in FIG. 4, the air electrode 8 has different porosities between the end portions 8*a* constituted by the first end portion 8*a*1 and the second end portion 8*a*2 located at both ends in the width direction W and the center portion 8*b* located between the first end portion 8*a*1 and the second end portion 8*a*2. On the other hand, as illustrated in FIG. 8, the porosities may be different between the end portions 8*a* corresponding to the first end portion 8*a*1 located at one end in the width direction W and the center portion 8*b* which is a portion excluding the end portions 8*a*.

As illustrated in FIG. 8, the end portions 8*a* are regions in which a distance from the long side along the width direction W is the predetermined distance X1 or less in the air electrode 8. In the present variation, the distance X1 is, for example, 25% of the length W1 in the width direction W of the air electrode 8.

As illustrated in FIG. 9, the air electrode 8 may have different porosities between the end portions 8*a* located at both ends in the width direction W and at both ends of the length direction L and the center portion 8*b* located inside the end portions 8*a*.

As illustrated in FIG. 9, in the air electrode 8, the end portions 8*a*, have a predetermined distance X1 or less and X2 or less from the long sides, respectively, along the width direction W, and a predetermined distance X3 or less and X4 or less from the short sides, respectively, along the length direction L.

In the present variation, the distance X1 is, for example, 25% of the length W1 in the width direction W of the air electrode 8. The distance X2 is, for example, 25% of the length W1 in the width direction W of the air electrode 8. The distance X3 is, for example, 15% of the length L1 of the length direction L of the air electrode 8. The distance X4 is, for example, 15% of the length L1 of the length direction L of the air electrode 8.

Second Embodiment

Subsequently, a cell stack device and a cell according to the second embodiment will be described with reference to FIG. 10 to FIG. 13B.

In the embodiment described above, a so-called "vertically striped type" cell stack device, in which only one element portion including a fuel electrode, a solid electrolyte layer, and an air electrode is provided on the surface of the support substrate, is exemplified. However, the present disclosure can be applied to a horizontally striped type cell stack device with an array of so-called "horizontally striped type" cells, in which a plurality of element portions are provided on the surface of a support substrate at mutually separated locations, and adjacent element portions are electrically connected to each other.

Figure 10:
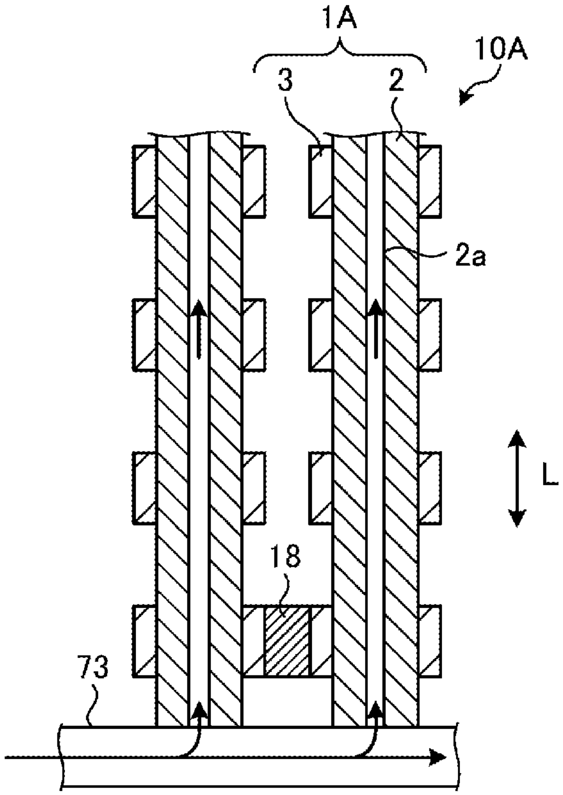
FIG. 10 is a cross-sectional view schematically illustrating a cell according to a second embodiment.

FIG. 10 is a cross-sectional view schematically illustrating the cell according to the second embodiment. As illustrated in FIG. 10, the cell stack device 10A includes a plurality of cells 1A extending in the length direction L from a pipe 73 that distributes fuel gas. The cell 1A includes a plurality of element portions 3 on the support substrate 2. the gas-flow passage 2*a* through which a gas from the pipe 73 flows is provided inside the support substrate 2. The element portions 3 on the support substrate 2 are electrically connected by a connection layer 8A, which will be described later. The plurality of cells 1A are electrically connected to each other via the electrically conductive members 18. The electrically conductive members 18 are each located between the element portions 3 each included in a corresponding one of the cells 1A and electrically connect adjacent ones of the cells 1A to each other.

Figure 11:
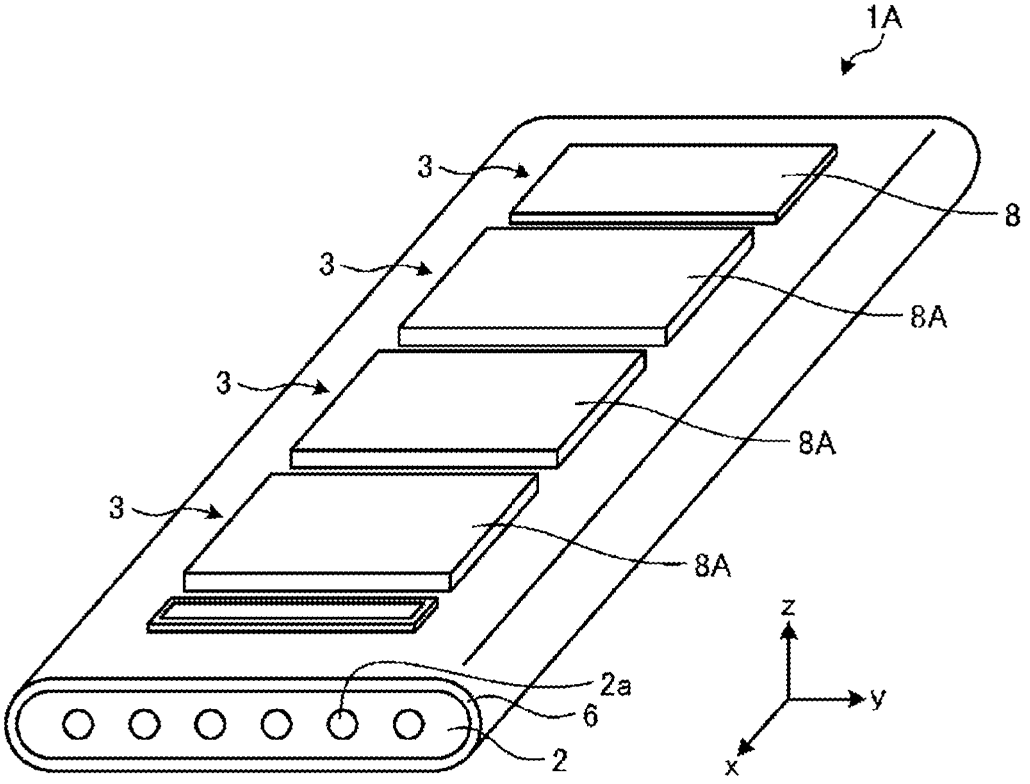
FIG. 11 is a perspective view illustrating an example of the cell according to the second embodiment.
Figure 12:
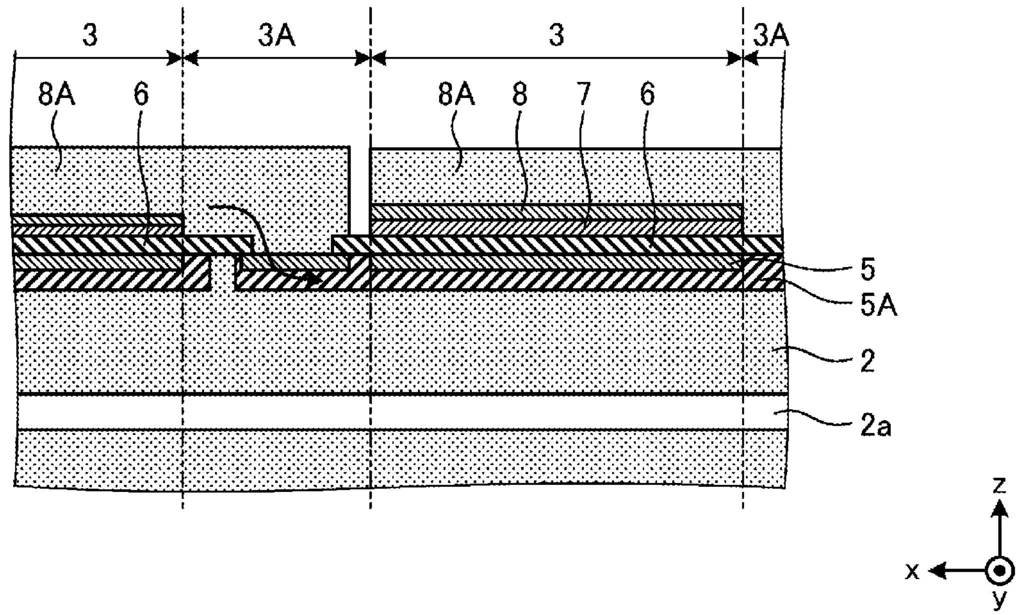
FIG. 12 is a cross-sectional view illustrating the example of the cell according to the second embodiment.

FIG. 11 is a perspective view illustrating an example of the cell according to the second embodiment. FIG. 12 is a cross-sectional view illustrating the example of the cell according to the second embodiment. In the cell 1A, the element portions 3 and connecting portions 3A are alternately located in an X axis direction.

The cell 1A has a shape that is vertically symmetric with respect to a plane that passes through a center in the thickness direction (Z-axis direction) and parallel to a main surface of the support substrate 2.

The element portion 3 includes the fuel electrode 5, the solid electrolyte layer 6, the intermediate layer 7, and the air electrode 8 layered in this order. The connection layers 8A for electrically connecting the element portions 3 adjacent to each other in the X axis direction are located on the surface of the air electrode 8. Further, a fuel electrode current collecting portion 5A having electron conductivity is located on the surface of the fuel electrode 5.

The air electrode 8 according to the present embodiment has different porosities for each portion as in the air electrode 8 according to the first embodiment.

Figure 13A:
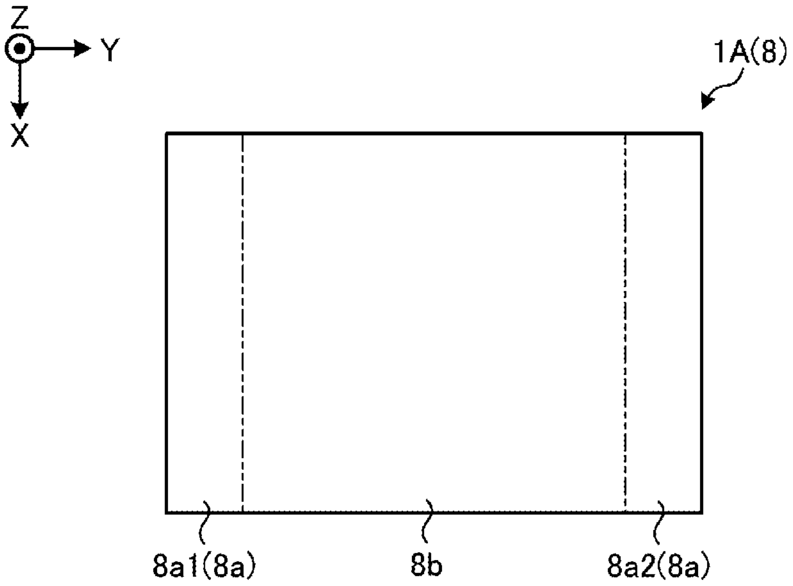
FIG. 13A is a side view of the cell according to the second embodiment as viewed from the air electrode side.

FIG. 13A is a side view of the cell according to the second embodiment, as viewed from the air electrode side. As illustrated in FIG. 13A, the air electrode 8 includes end portions 8*a* and a center portion 8*b*.

The end portions 8*a* are regions constituted by a first end portion 8*a*1 and a second end portion 8*a*2 located at both ends in a Y-axis direction when the air electrode 8 is viewed in plan view. The center portion 8*b* is a region sandwiched between the first end portion 8*a*1 and the second end portion 8*a*2 of the end portions 8*a*.

As illustrated in FIG. 13A, the end portions 8*a* of the air electrode 8 are located at both ends in the Y-axis direction intersecting the X axis direction where the gas-flow passages 2*a* extend. The porosity of the end portion 8*a* is greater than the porosity of the center portion 8*b*. This can improve battery performance.

Note that in FIG. 13A, an example is illustrated in which the porosities of both the first end portion 8*a*1 and the second end portion 8*a*2 are greater than the porosity of the center portion 8*b*; however, one of the porosities of the first end portion 8*a*1 and the second end portion 8*a*2 may be greater than the porosity of the other portion.

Figure 13B:
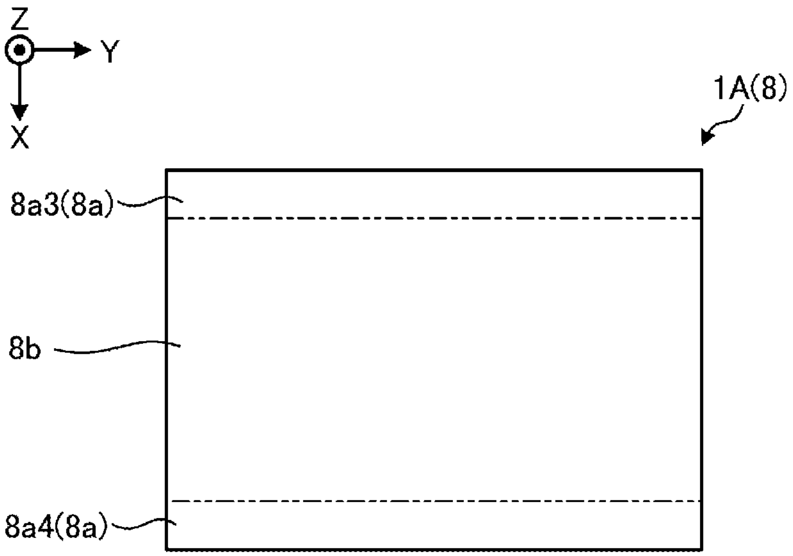
FIG. 13B is a side view of a cell according to a variation of the second embodiment, as viewed from the air electrode side.

FIG. 13B is a side view of the cell according to a variation of the second embodiment, as viewed from the air electrode side. In the air electrode 8 illustrated in FIG. 13B, when viewed in plan view, the end portions 8*a* are located at both ends in the X axis direction in which the gas-flow passages 2*a* extend. The porosity of the end portions 8*a* is greater than the porosity of the center portion 8*b* located between a third end portion 8*a*3 and a fourth end portion 8*a*4. This can improve battery performance.

As described above, by making the porosity in the end portions 8*a* of the air electrode 8 greater than the porosity in the center portion 8*b*, the end portions 8*a* of the air electrode 8 function as stress relaxation portions. This makes the air electrode 8 less likely to peel off from the intermediate layer 7. Thus, the durability of the cell 1A can be enhanced.

By making the porosity in the end portions 8*a* of the air electrode 8 greater than the porosity in the center portion 8*b*, the oxygen-containing gas introduced from the end portion 8*a* sides of the air electrode 8 is easily transferred to the center portion 8*b*. Thus, the power generation efficiency in the cell 1A is improved.

By making the porosity in the center portion 8*b* of the air electrode 8 smaller than the porosity in the end portions 8*a*, ionic conductivity in the center portion 8*b* of the air electrode 8, which has a greater contribution to power generation than the end portions 8*a*, is improved. Thus, the power generation efficiency in the cell 1A is improved.

That is, in the element portion 3 according to the present embodiment, the porosity is increased in the end portion 8*a* of the air electrode 8 having a smaller contribution to power generation than the center portion 8*b*, emphasizing a stress relaxation effect rather than the power generation efficiency, while the porosity is decreased in the center portion 8*b*, emphasizing the power generation efficiency. This improves the battery performance of the cell 1A.

Other Variations

Subsequently, a cell stack device according to other modifications of the embodiment will be described.

In the embodiments mentioned above, the case where a support substrate of the hollow flat plate type is used has been exemplified; however, the embodiments can also be applied to a cell stack device using a cylindrical support substrate or a cell stack device of the flat plate type.

In the above embodiments, an example in which a fuel electrode is provided on a support substrate and an air electrode is disposed on a surface of a cell, is illustrated. However, the present disclosure can also be applied to a cell stack device that has an opposite arrangement to the above, that is, an arrangement in which an air electrode is provided on a support substrate and a fuel electrode is disposed on a surface of a cell.

Further, in the aforementioned embodiments, the "cell", the "cell stack device", the "module", and the "module housing device" are exemplified by the fuel cell, a fuel cell stack device, a fuel cell module, and a fuel cell device, respectively, but they may also be exemplified by an electrolytic cell, an electrolytic cell stack device, an electrolytic module, and an electrolytic device, respectively.

While the present disclosure has been described in detail, the present disclosure is not limited to the aforementioned embodiments, and various changes, improvements, and the like can be made without departing from the gist of the present disclosure.

As described above, the cell 1 according to the embodiments includes the element portion 3 that includes the fuel electrode 5, the solid electrolyte layer 6, the air electrode 8, and the intermediate layer 7. The intermediate layer 7 is provided between the solid electrolyte layer 6 and the air electrode 8. The porosity in the end portions 8*a* of the air electrode 8 in plan view is greater than the porosity in the center portion 8*b* of the air electrode 8. This can improve the battery performance of the cell 1.

Also, the cell stack device 10 according to the embodiments includes the cell stack 11 including the plurality of cells 1 mentioned above. As a result, the cell stack device 10 can be obtained that is improved in battery performance.

Further, the module 100 according to the embodiments includes the cell stack device 10 described above, and the housing container 101 that houses the cell stack device 10. As a result, the module 100 can be obtained that is improved in battery performance.

Further, the module housing device 110 according to the embodiments includes the module 100 described above, the auxiliary device for operating the module 100, and the external case that houses the module 100 and the auxiliary device. As a result, the module housing device 110 can be obtained that is improved in battery performance.

Noted that the embodiments disclosed herein are exemplary in all respects and not restrictive. Indeed, the aforementioned embodiments can be embodied in a variety of forms. Furthermore, the aforementioned embodiments may be omitted, replaced, or changed in various forms without departing from the scope of the appended claims and the purpose thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell comprising:
a hollow and flat support substrate;
an element portion comprising
a fuel electrode supported on the support substrate,
a solid electrolyte layer,
an air electrode, and
an intermediate layer located between the solid electrolyte layer and the air electrode, wherein
in a plan view, a porosity in an end portion of the air electrode is greater than a porosity in a center portion of the air electrode.

2. The cell according to claim 1, wherein
a porosity of the air electrode located at an end portion in a second direction intersecting a first direction in which a fuel gas flows is greater than a porosity of the air electrode located at a center portion in the second direction.

3. The cell according to claim 1, wherein
a porosity of the air electrode located at both ends in a first direction in which a fuel gas flows is greater than a porosity of the air electrode located at a center portion in the first direction.

4. The cell according to claim 1, wherein
the intermediate layer comprises
a first intermediate layer that comprises Ce and does not comprise Zr, and
a second intermediate layer that is located between the first intermediate layer and the solid electrolyte layer and comprises Ce and Zr, and
in the plan view, the second intermediate layer overlaps at least a portion of an outer peripheral portion of the element portion.

5. The cell according to claim 4, wherein
in the plan view, the second intermediate layer overlaps at least a pair of portions of the outer peripheral portion of the element portion, the pair of portions facing each other with a center portion of the element portion interposed therebetween.

6. A cell stack device comprising:
a plurality of cells according to the cell of claim 1.

7. A module comprising:
the cell stack device according to claim 6; and
a housing container configured to house the cell stack device.

8. A module housing device comprising:
the module according to claim 7;
an auxiliary device configured to operate the module; and
an external case configured to house the module and the auxiliary device.

9. A cell comprising:
a support substrate;
an element portion comprising
a fuel electrode supported on the support substrate,
a solid electrolyte layer,
an air electrode, and
an intermediate layer located between the solid electrolyte layer and the air electrode, wherein
in a plan view, a porosity in an end portion of the air electrode is greater than a porosity in a center portion of the air electrode,
a principal surface of the air electrode does not protrude from a principal surface of the intermediate layer in a plan view.

10. A cell comprising:
a support substrate;
an element portion comprising
a fuel electrode supported on the support substrate,
a solid electrolyte layer,
an air electrode, and
an intermediate layer located between the solid electrolyte layer and the air electrode, wherein
in a plan view, a porosity in an end portion of the air electrode is greater than a porosity in a center portion of the air electrode,
in a plan view, a contour of the air electrode lies inside a contour of at least one of the fuel electrode, the solid electrolyte layer, and the intermediate layer.

* * * * *